United States Patent
Marchand

[15] 3,685,211
[45] Aug. 22, 1972

[54] APPARATUS FOR SUPPORTING AND CUTTING AN EXTRACTED LENGTH OF STOCK MATERIAL AT A STOCK MATERIAL RACK

[72] Inventor: Jacques J. Marchand, 25 Park St., Montclair, N.J. 07042

[22] Filed: May 26, 1970

[21] Appl. No.: 40,528

[52] U.S. Cl. .............................51/98, 51/99, 83/417, 83/490
[51] Int. Cl. ..........................B26d 7/00, B23d 47/04
[58] Field of Search........83/417, 490, 446, 279–281, 83/517, 13; 143/147 J, 147 H; 51/98, 99

[56] References Cited

UNITED STATES PATENTS

| | | | |
|---|---|---|---|
| 3,330,175 | 7/1967 | Bridges | 83/417 X |
| 1,216,315 | 2/1917 | Heckman | 83/517 |
| 3,421,265 | 1/1969 | Parachek | 51/98 |
| 3,057,240 | 10/1962 | DeWitt | 83/490 X |
| 3,122,183 | 2/1964 | Striebig | 143/47 J |

FOREIGN PATENTS OR APPLICATIONS

| | | | |
|---|---|---|---|
| 218,079 | 5/1958 | Australia | 143/47 H |

Primary Examiner—James M. Meister
Attorney—Robertson, Bryan, Parmelee & Johnson

[57] ABSTRACT

Method and apparatus for supporting and cutting an extracted length of stock material at a stock material rack. The apparatus includes a carriage having a stock support rest adapted to receive an extracted length of stock material and an adjustable cutting means for cutting a desired length of extracted stock material. A first means adjusts the carriage vertically along a defined plane parallel to the plane defined by the rack. A second means adjusts the carriage horizontally along the defined plane whereby the first and second carriage adjusting means combine to provide complete adjustability to the stock support rest and cutting means for movement to any desired rack location. Pivot means is provided for adjusting the cutting means between a cutting and non-cutting position relative to the stock support rest. Drive means actuates the cutting means when the extracted piece of stock material is properly positioned on the stock support rest.

5 Claims, 9 Drawing Figures

INVENTOR.
Jacques J. Marchand
BY
Robertson, Bryan, Parmelee & Johnson
ATTORNEYS.

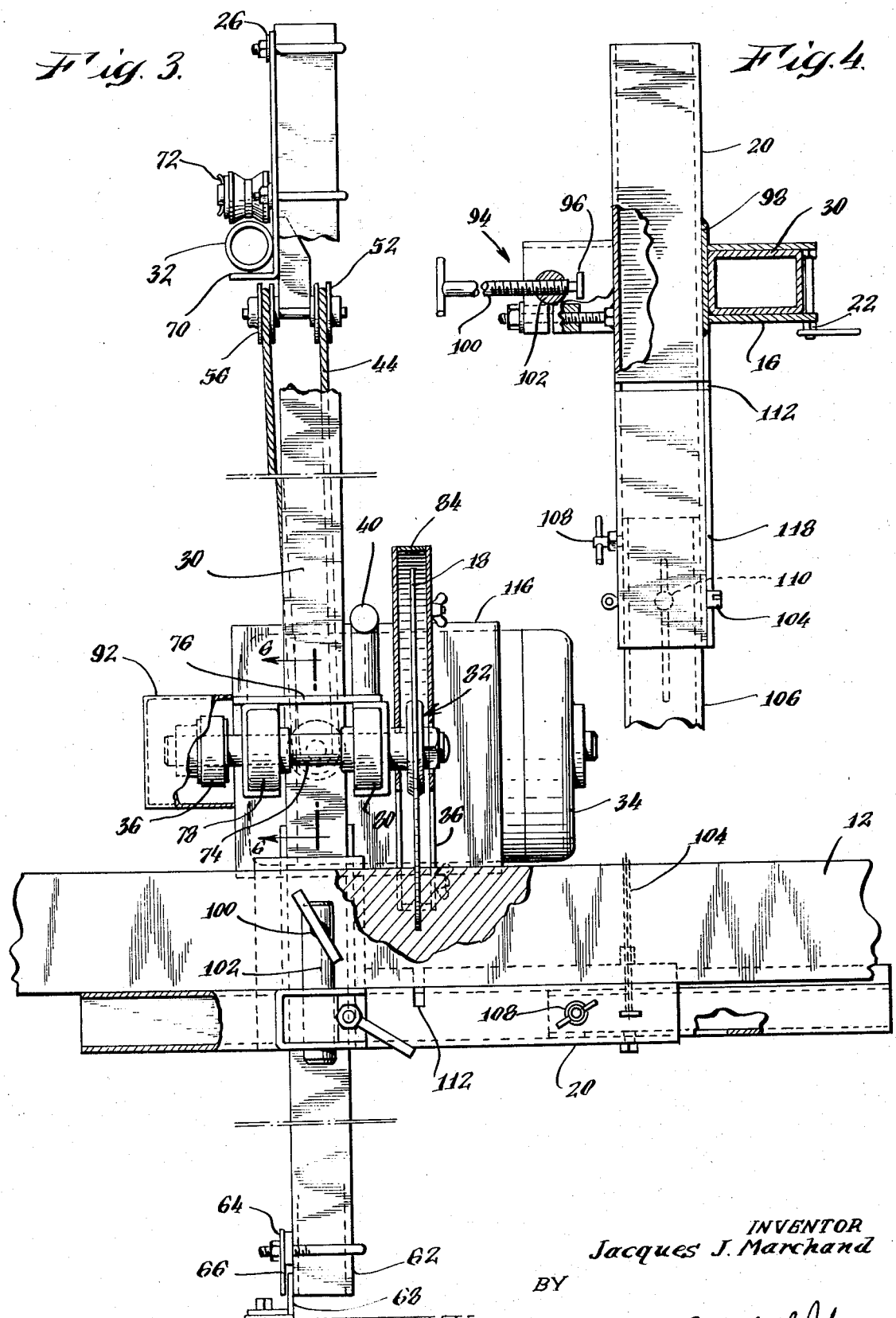

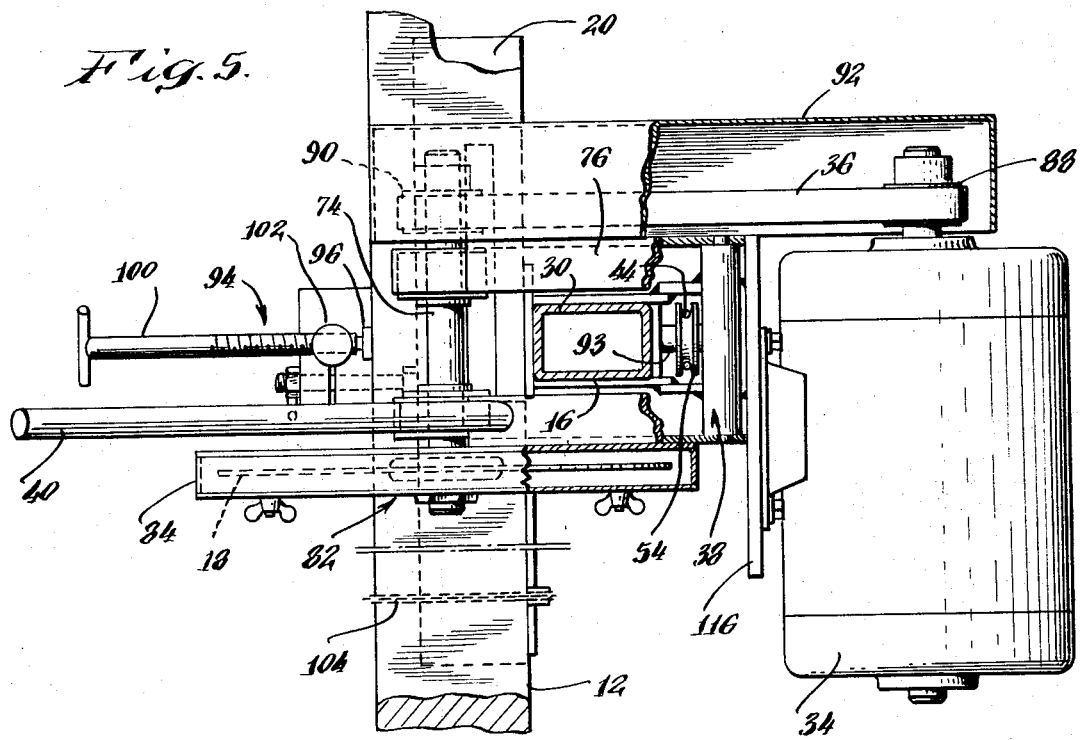
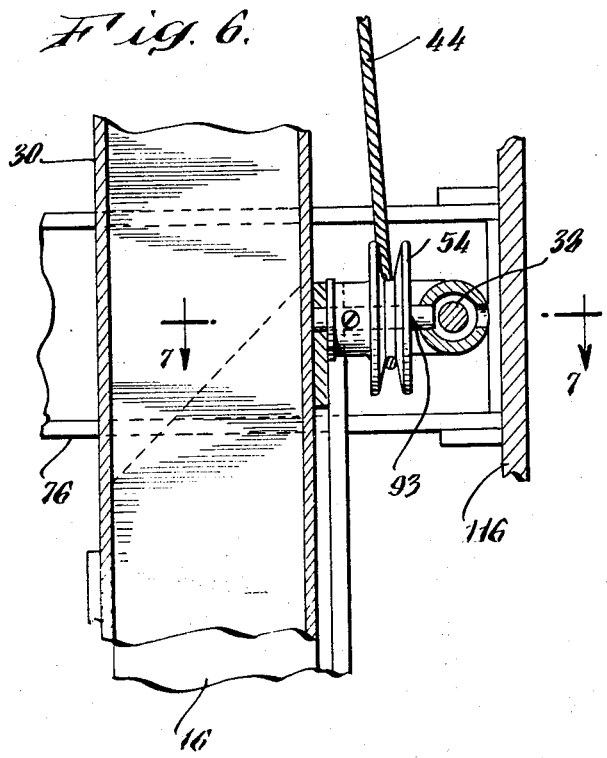
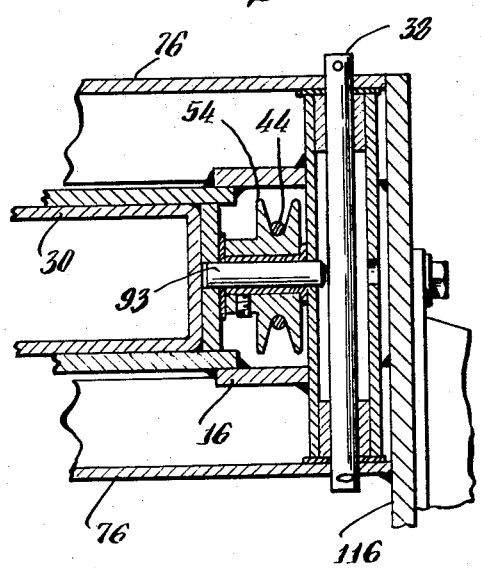

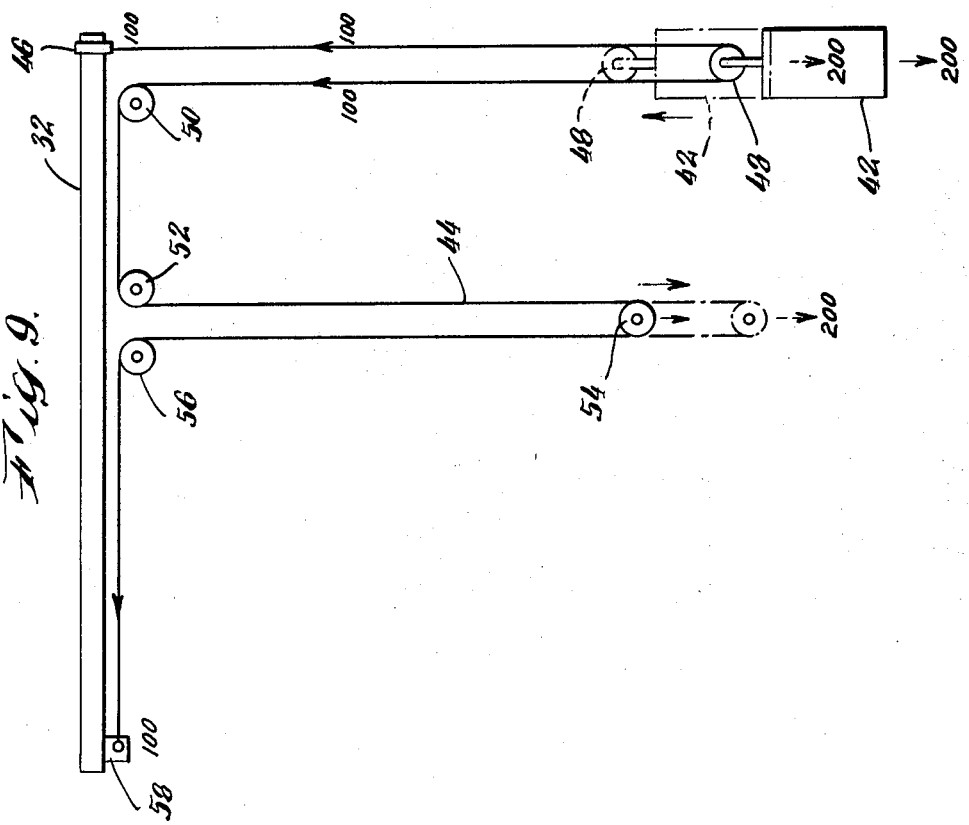
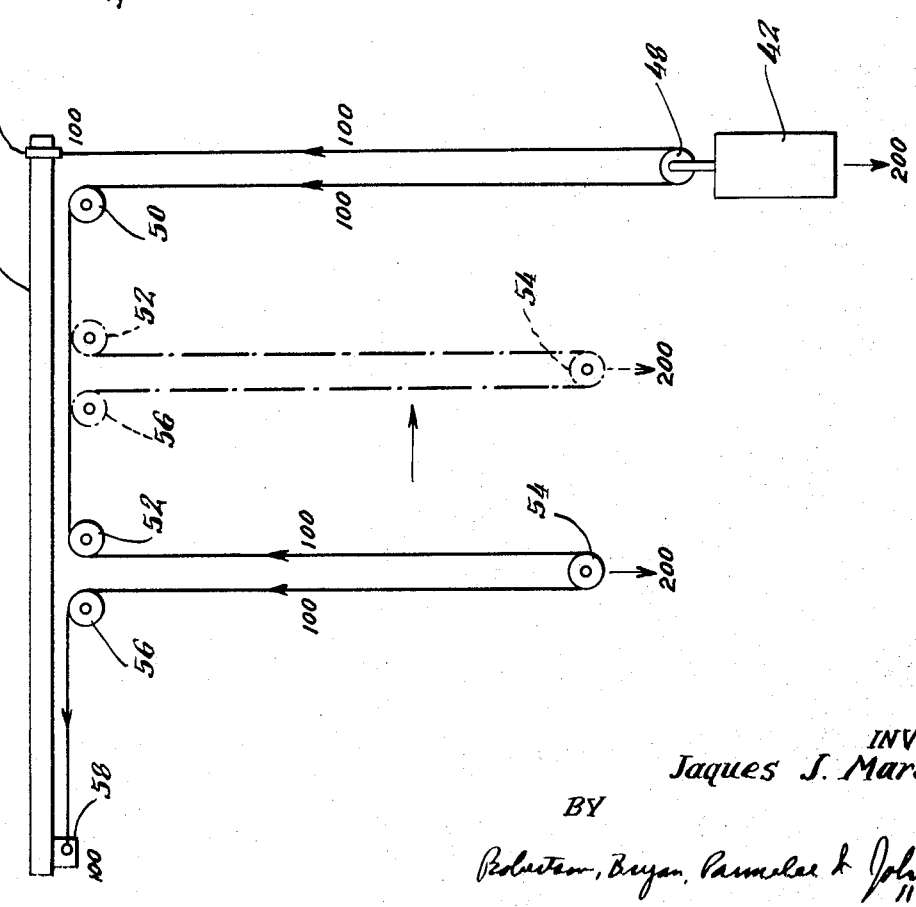

APPARATUS FOR SUPPORTING AND CUTTING AN EXTRACTED LENGTH OF STOCK MATERIAL AT A STOCK MATERIAL RACK

The present invention relates to a method and apparatus for supporting and cutting an extracted length of stock material at a stock material rack. More specifically, it relates to a multi-directional supporting and cutting apparatus for receiving a partially extracted piece of stock material directly from the rack and cutting the extracted piece of stock material to the length required.

It is generally the practice in factories and warehouses for an individual worker to go to an individual stock material rack and select a standard length of stock material or obtain the stock from a stock unit operator. The entire piece of stock material is transported through the warehouse or factory to a saw where a desired length of stock material is cut. The unused portion of the stock material is then transported back through the factory or warehouse and returned to the rack.

It is an advantage of the present invention that a desired length of stock material may be rapidly and efficiently cut at the stock material rack saving man hours in transporting stock material to and from the stock material rack.

It is another advantage of the present invention that safety to plant workers is enhanced since the stock material need not be completely removed and returned to the rack. The potential injury to workers from physical exertion and accidental damage to workers or equipment from having to handle the entire piece of stock material is minimized.

Moreover, the present invention minimizes the eventual possibility of misplacing bar stock in the wrong place in the rack after multiple reuse.

It is another advantage that there is a saving in floor space and labor cost. There is often a stock material unit and cutting operator, with the present invention the need for two units is removed saving labor cost.

The present invention provides a method and apparatus for rapidly positioning a carriage including a stock support rest and an abrasive cutting wheel at a given stock material rack. A partially extracted length of stock material is directly received from the rack and cut to the required length, generally without the need for complete removal of the stock material from the rack. A first carriage adjusting means with a suitable weight balancing system and a vertical carriage adjustment lock are provided for movement of the carriage vertically. A second carriage adjustment means includes a horizontal track and guide rail for movement of the carriage horizontally. The carriage is adjusted vertically and horizontally to the desired rack position and a piece of stock material partially extracted from the rack is positioned along the stock support rest and may be clamped there. In the example shown, the cutting means includes a drive motor and timing belt operatively associated with an abrasive cutting wheel. When the motor is actuated the cutting wheel is pivoted from an up position to a down position cutting the partially extracted stock material. After the cutting wheel is returned to the up position, the remaining extracted length of stock material may then be slid back into the rack. Thus, an efficient and rapid method and apparatus is provided for accurately cutting required lengths of stock material. Motorized drives for both vertical and horizontal traverse may be provided and the cutting means may be automatically controlled.

Other objects and advantages of the present invention will be more apparent when the detailed description is considered in conjunction with the accompanying drawings as follows:

FIG. 3 is a side view in partial section of the apparatus shown in FIG. 1;

FIG. 4 is a partial sectional view taken along line 4—4 of FIG. 2;

FIG. 5 is a plan view in partial section of the carriage;

FIG. 6 is a partial sectional view taken along line 6—6 of FIG. 3;

FIG. 7 is a sectional view taken along line 7—7 of FIG. 6;

FIGS. 8 and 9 are schematic diagrams showing a pulley system employed in the present invention.

Figure 1:
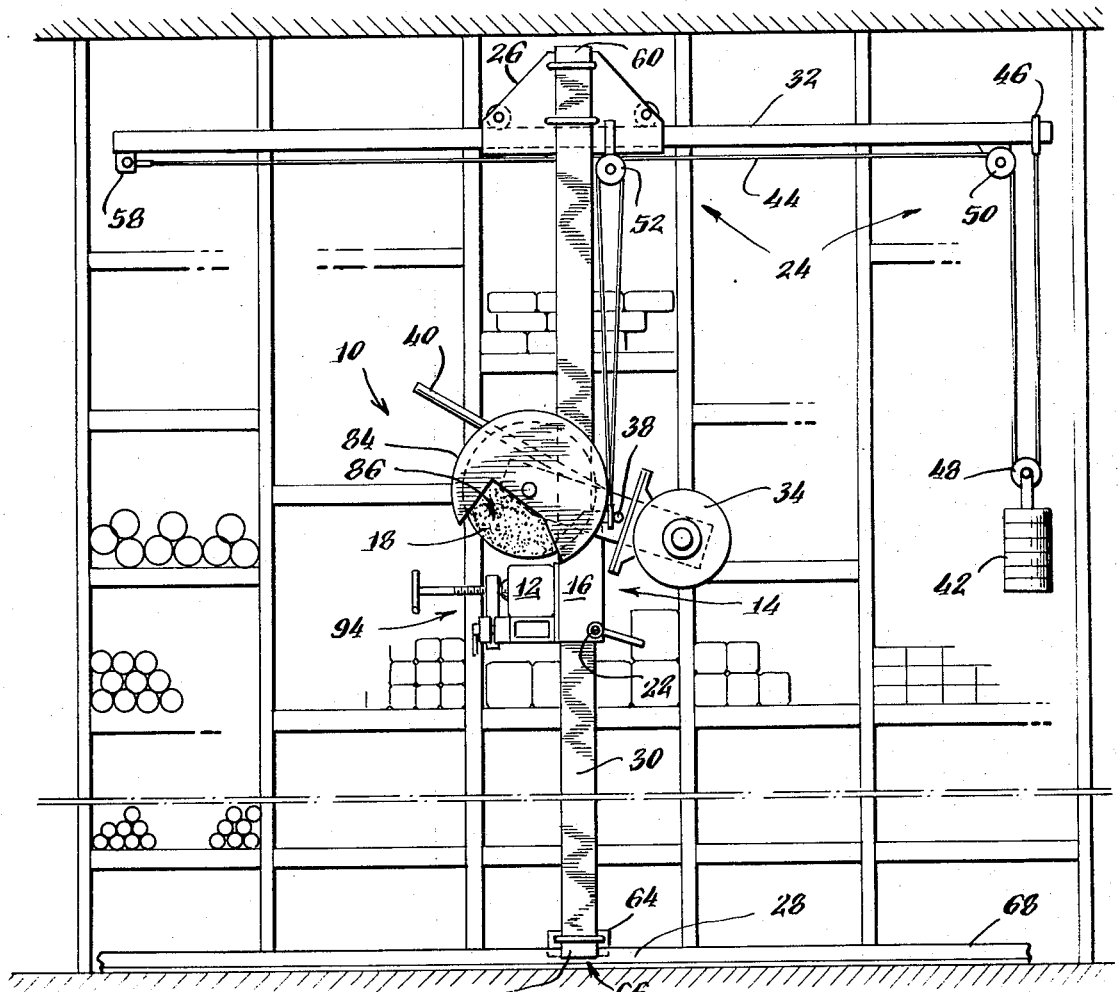
FIG. 1 is a front view of the multi-directional supporting and cutting apparatus positioned at a stock material rack and supporting an extracted piece of stock material.

Referring to FIG. 1, the multi-directional supporting and cutting apparatus 10 is shown positioned adjacent a plurality of stock material racks in a warehouse or factory to receive an extracted piece of stock material 12 from a stock material rack 14. The apparatus 10 includes a carriage 16 having a cutting means, shown as an abrasive cutting wheel 18, pivotally attached thereto. A stock support rest 20 is rigidly mounted to the carriage 16 to receive the extracted piece of stock material 12.

A first and second carriage adjustment means is shown for moving the carriage 16 in a defined plane substantially parallel to the plane defined by the plurality of racks to make the stock support rest 20 and abrasive cutting wheel 18 adjustable to various individual rack locations. The first carriage adjustment means provides vertical adjustability to the carriage and includes a carriage adjustment lock 22 and counterweight-pulley arrangement 24. The second carriage adjustment means moves the carriage 16 transversely to the movement caused by said first carriage adjustment means, i.e. horizontally. The second carriage adjustment means includes a carrier trolley 26 and lower guide rail 28 operatively associated with the carriage 16 through a vertical support column 30. The carrier trolley 26 is arranged along a horizontal track 32 to provide horizontal adjustability to the carriage 16.

The combined affect of the first and second carriage adjustment means is to allow complete adjustability of the carriage 16 both vertically and horizontally in the defined plane for positioning the same at the desired rack 14 prior to extraction of the desired piece of stock material 12.

Figure 2:
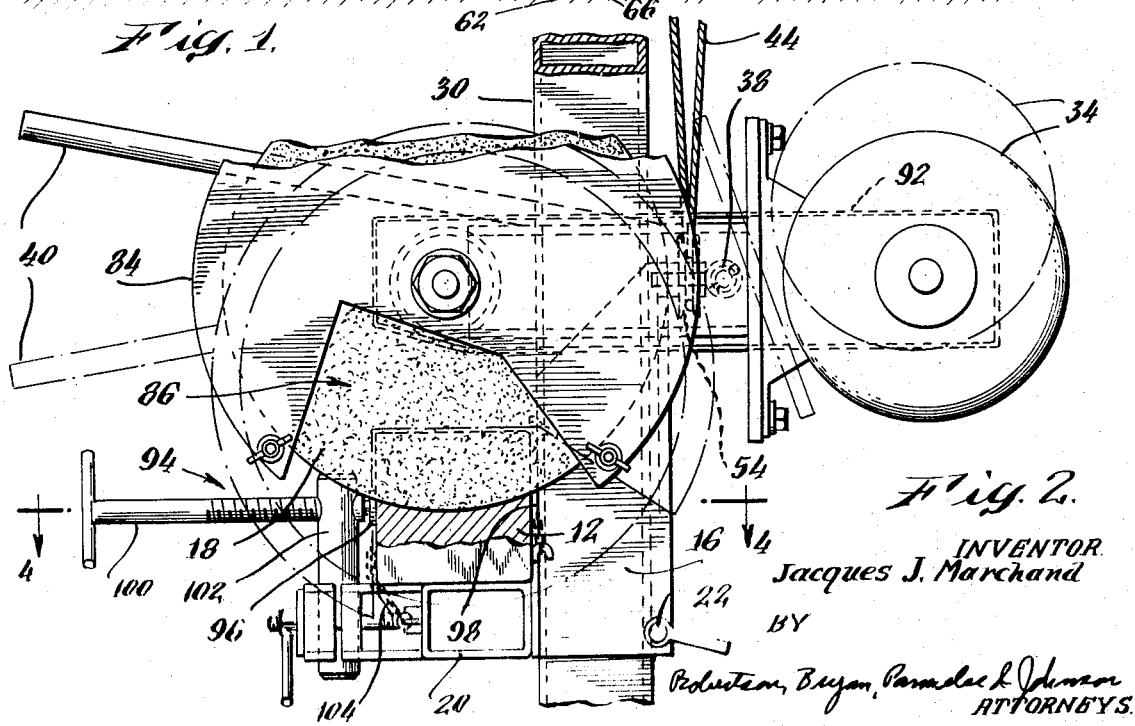
FIG. 2 is an enlarged front view in partial section of the carriage shown in FIG. 1.

Referring to FIGS. 2, 3, and 5 the drive means is shown including a drive motor 34 operatively associated with the abrasive cutting wheel 18 through a drive belt 36, seen best in FIG. 5. Wheel adjusting means is provided for pivoting the abrasive cutting wheel 18 and motor 34 relative to the stock support rest 20 including a cutting pivot 38 and handle 40 for moving the abrasive cutting wheel 18 from an up position to a down position for cutting through the stock material 12.

The carriage 16 is shown adjustably mounted to the vertical support column 30 and secured in its vertical position by the counterweight 42 and the vertical adjustment lock 22 which fixes the position of the carriage 16 along the vertical support column 30.

As shown most completely in FIG. 1, and with reference to the diagrams of FIGS. 8 and 9, the counterweight-pulley system 24 includes a counterweight cable 44 anchored to a mounting 46 attached to the horizontal track 32. The cable 44 passes around a first pulley 48, supporting a suitable counterweight 42, for example a 200 pound counterweight. The cable continues to a second pulley 50 attached to the horizontal track 32 and then to a third pulley 52 attached to the carrier trolley 26 and movable therewith. From the third pulley 52 the cable 44 extends down around a fourth pulley 54 mounted to the carriage 16 and back up to a fifth pulley 56 attached to the carrier trolley 26 and moveable therewith. As seen in FIG. 3, the pulleys 52 and 56 are mounted on a common axis. The cable 44 extends over and is anchored to the horizontal track 32 by means of a bracket 58.

The carriage trolley 26 is rigidly secured to one end 60 of the vertical support column 30 whereby movement of the trolley 26 along the horizontal track 32 provides horizontal movement of the vertical support column 30 and carriage 16 adjustably attached thereto. The opposite end 62 of the vertical support column 30 has a flange 64 bolted thereto forming a slot 66 between the column end 62 and the flange 64. A guide rail 68 is bolted to the floor and extends upwardly transversely therefrom into the slot 66, see FIG. 3. The flange 64, column end 62 and guide rail 68 combine to provide stability to the vertical support column 30.

As shown in FIG. 3, the carrier trolley 26 includes a retainer flange 70 positioned below the horizontal track 32 and a pair of trolley rollers 72 (only one is shown in FIG. 3) fastened to the carrier trolley 26 for movement of the carrier trolley 26 along the horizontal track 32. At the opposite end 62 of the vertical support column 30 the guide rail 68 is shown positioned in the slot 66 formed by the flange 64 and the opposite end 62.

Referring to FIGS. 3 and 5, the timing belt 36 is shown connected to the abrasive cutting wheel 18 through a drive shaft 74. The drive shaft 74 is rotatably mounted to a pivotal support frame 76 through shaft bearings 78 and 80. The timing belt 36 is shown operatively associated with the drive shaft 74 for rotation of the abrasive cutting wheel 18 which is rigidly attached thereto. The abrasive cutting wheel 18 is rigidly attached to the shaft 74 through clamping means 82 and arranged within a wheel guard 84 having a removed portion 86 (FIG. 2) which exposes the abrasive cutting wheel 18 to the extracted piece of stock material 12. The handle or cutting arm 40 is shown fastened to the pivotal support frame 76 for pivotal movement of the shaft 74 and abrasive cutting wheel 18 attached thereto about cutting pivot 38 from an up position of non-contact to a down position of severing contact with the extracted stock member 12 resting upon the stock support rest 20. The handle 40 may also be used to return the cutting wheel 18 to its up position after the extracted stock member 12 is cut.

Referring to FIG. 5, the drive motor 34 is shown with a drive pulley 88 serving to drive a driven pulley 90 through the timing belt 36. The timing belt 36 and pulleys 88 and 90 are provided with suitable meshing teeth similar to gears to prevent belt slippage, and they are housed within a belt guard 92. The abrasive cutting wheel 18 and motor 34 are pivotally connected to the pivotal support frame 76 at cutting pivot 38. As shown in FIGS. 6 and 7, the fourth pulley 54 is mounted on a carriage support shaft 93.

Referring to FIGS. 2 and 5, the extracted piece of stock material 12 is shown resting upon the stock support rest 20 and an adjustable stock clamp 94 can be used to secure the stock material 12 in position prior to cutting.

As shown in FIG. 4 the stock support rest 20 is shown rigidly secured to the carriage 16. The adjustable stock clamp 94 is horizontally and vertically adjustable relative to the stock support rest to clamp an extracted piece of stock 12 between the clamp face 96 and a carriage stock retainer wall 118 located on the opposite side of the support rest 20 from the clamp 94. The stock clamp 94 includes horizontal and vertical members 100 and 102, respectively, to control the positioning of the clamp face 96. A chain 104, best seen in FIGS. 2, 3 and 5 may be used with the stock support rest 20 to aid in holding a large piece of stock material 12 prior to cutting so that after cutting the cut piece will not fall from the stock support rest 20.

The stock support rest 20 has a telescoping tube 106 (FIG. 4) arranged therein for extension or retraction by loosening and tightening lock nuts 108 and 110 as desired to support various lengths of required cuts of stock material. A clearance slot 112 (FIG. 3) is arranged in the stock support rest 20 to enable the abrasive cutting wheel 18 to cut completely through the stock material 12 without damaging the stock support rest 20. A chain support clamp 114 for securing chain 104 is attached to the stock support rest 20 and located on the side of the clearance cut 112 on which the required length of stock material is located.

Referring to FIGS. 6 and 7, the fourth pulley 54 is shown concentrically aligned with horizontal carriage shaft 93. The pivotal support frame 76 is shown pivotally mounted to the cutting pivot 38. Motor mounting plate 116 is bolted to the support frame 76 for pivotal movement therewith. The carriage 16 supports the horizontal carriage shaft 93 and cutting pivot 38 allowing pivotal movement of the support frame 76 relative thereto.

Referring to FIGS. 8 and 9, force diagrams of the counterweight-pulley system 24 are shown. The counterweight 42 employed has a weight of approximately 200 pounds to approximately equal and counterbalance the weight of the carriage 16, cutting wheel 18, stock support rest 20, drive motor 34 and pivotal support frame 76. Each end of the counterweight cable 44 is anchored to support 100 pounds. The cable 44 supporting the counterweight 42 and the carriage 16, etc. is fed around second and third pulleys 50 and 52 respectively. The third and fifth pulleys 52 and 56, respectively, are attached to carrier trolley 26 whereby horizontal movement of the carriage trolley 26 along the horizontal track 32 causes the third and fifth pulley 52 and 56 to move to the right or left maintaining the same cable length between the fourth pulley 54 and the third and fifth pulleys 52 and 56, respectively; see the dotted lines in FIG. 8 showing movement of the third and fifth pulleys 52 and 56 to the right.

If vertical movement of the carriage 16 is desired the vertical adjustment lock 22 is released and the carriage 16 is easily moved upward or downward along the vertical support column 30 causing the length of cable between the fourth pulley 54 and the third and fifth pulleys 52 and 56, respectively, to thereby decrease or increase. Thus, the cable length between the first pulley 48, supporting the counterweight 42, and the second pulley 50 will increase or decrease, respectively, to provide a balanced system.

In operation, the carriage 16 is adjusted horizontally and vertically to the desired rack location 14 to receive an extracted lenght of stock material 12. The telescoping tube 106 of the stock support rest 20 is extended to support the length of stock material 12 desired to be cut. The abrasive cutting wheel 18, is maintained in an up position and the required length of stock material is extracted from the rack 14 and positioned along the stock support rest 20 against support guide flange 118, extending onto the telescoping tube 106. The stock clamp 94 is then adjusted vertically and horizontally so that the clamp face 96 and carriage retainer wall 118 combine to hold the stock material 12 rigidly in position on the stock support rack 20. The chain clamp 114 may be used with a chain 104 to give added support to the stock material 12 should it be required to cut a large length.

With the stock material 12 in position and properly supported the drive motor 34 is energized by conventional means (not shown) to drive the abrasive cutting wheel 18 through timing belt 36. The abrasive cutting wheel 18 is moved from an up position to a down position by the use of cutting arm or handle 40 allowing the cutting wheel 18 to pivot about the cutting pivot 38. The required length of stock material is severed from the extracted piece of stock material 12 as the cutting wheel 18 passes through the stock material 12 into clearance slot 112. The cutting wheel 18 is returned to its up position and may be de-energized. The required length of stock material is removed from the stock support rest 20, after being unchained if necessary, and the remaining length of stock material is unclamped.

If additional lengths of stock material are required the extracted piece of stock material may be re-positioned along the stock support rest 20 and reclamped. If no additional lengths of that piece of stock 12 are required the remaining length of stock may be slid back into position in its rack 14.

Additional pieces of stock material may be severed from the same rack 14 after making slight vertical and horizontal adjustments of the stock support rest 20, if desired. If it is required to cut a length of stock material located in another rack the carriage 16 is moved horizontally and vertically until properly positioned at the new rack location.

Guide slot 62 and guide rail 68 aid the carrier trolley 26 in providing stability to the vertical support column 30 and carriage 16 attached thereto. To obtain horizontal movement of the carriage 16 the carriage trolley 26 is moved along the horizontal track 32 by trolley rollers 72. This results in horizontal movement of the vertical support column 30 and the carriage 16.

Vertical adjustment of the carriage 16 is provided by unlocking the vertical adjustment lock 22 allowing the carriage 16 to be moved vertically upward or downward along the vertical support column 30 with the aid of the counterweight-pulley system 24. When the carriage 16 is moved upward or downward, the counterweight 42 moves in the opposite direction to balance the weight of the carriage 16. After achieving the desired vertical position of the carriage 16 along the vertical support column 30, the vertical adjustment lock 22 is secured. The stock support rest 20 is now in position to receive another extracted length of stock material for rapidly cutting the same to a required length without the need for completely removing the extracted piece of stock material from the rack.

It is an advantage of the method and apparatus of the present invention that motorized drives for both the vertical and horizontal traverse can be provided and automatically controlled for positioning the cutting carriage. Also, the cutting means can be automatically controlled for rendering the whole operation fully automatic, if desired.

It should be apparent to one skilled in the art that various modifications may be made in the apparatus or method herein described without departing from the spirit or scope of the invention as described in the specification and defined in the appended claims.

What is claimed is:

1. Multi-directional supporting and cutting apparatus for positioning a stock cutting means at any one of a plurality of stock material racks and adapted to receive an extracted piece of stock material directly from the rack to cut the extracted piece of stock material to the length required comprising:

a horizontal top support rail extending across near the top of said stock material racks, a carrier trolley supported by said top support rail, said carrier trolley being movable along said support rail, a vertical column secured to said carrier trolley and extending down from said carrier trolley, said column being supported by said carrier trolley, a carriage mounted on said column and being movable upwardly and downward along said column, cutting means mounted on said carriage, carriage adjustment locking means on said carriage for locking said carriage to said column to prevent such upward and downward movement when said carriage has been adjusted for positioning the cutting means in close proximity to the end of a rack of stock material to position the cutting means readily accessible to an extracted piece of stock material, means for supporting the extracted piece of stock material associated with said carriage means to provide support to the stock material extracted from said rack, means for moving said cutting means relative to said supporting means between a cutting and non-cutting position to bring said cutting means into contact with the extracted stock material resting upon said supporting means to cut a desired length thereof, and drive means for driving said cutting means when the extracted piece of stock material is positioned along said supporting means to cut the stock material to the desired length, whereby said carriage and cutting means are adjusted horizontally by moving said carrier trolley along said top support track and said carriage and cutting means are adjusted vertically by loosening said carriage adjustment lock for moving said carriage upwardly and downwardly along said column, and counterweight means secured to said carriage.

2. Multi-directional supporting and cutting apparatus as claimed in claim 1, in which said counterweight means includes a pair of pulleys mounted on said carrier trolley and a pulley mounted on said carriage and a pulley mounted near a first end of said top support rail.

a cable secured at one end near the second end of said top track, said cable extending horizontally over one of said pair of pulleys and then down and under said pulley on the carriage and then up and over the other of said pair of pulleys and then horizontally and over said pulley near the first end of said track and then down to a counterweight, whereby horizontal adjustment of said carrier trolley along said top support tract maintains the same cable length between the point at which the end of said cable is secured and said pulley near the first end of said track.

3. Multi-directional supporting and cutting apparatus as claimed in claim 2 in which said counterweight is secured to a pulley and the cable extends down beneath said pulley and then up to be secured near the first end of said top support track.

4. Multi-directional supporting and cutting apparatus as claimed in claim 1, in which said carrier trolley, column, carriage, cutting means, and stock supporting means are all suspended from and are supported by said top support track, a horizontal guide extending along the floor beneath and parallel to said top support rail, and guide means engaging said guide for providing stability to said column.

5. A method for rapidly and accurately obtaining a specified length of stock material from a piece of stock material chosen from a specified rack without the need to remove the stock material completely from the rack comprising the steps of:

orienting a cutting tool and support vertically and horizontally until it is properly positioned at the desired rack, partially extracting a piece of stock material from the rack, directing the extracted piece of stock material to a position below the cutting tool to rest upon said support while being also supported in part by the rack, securely clamping the extracted piece of stock material to said support, and cutting the specified length of stock material from the extracted piece of stock material whereby a specified length of stock material is rapidly and accurately cut from the extracted piece of stock material without the need for completely removing the entire piece of stock material from the rack.

* * * * *